Jan. 1, 1929.
T. RUSSELL
1,697,540
FASTENER LINK FOR SPROCKET CHAINS
Filed April 22, 1926
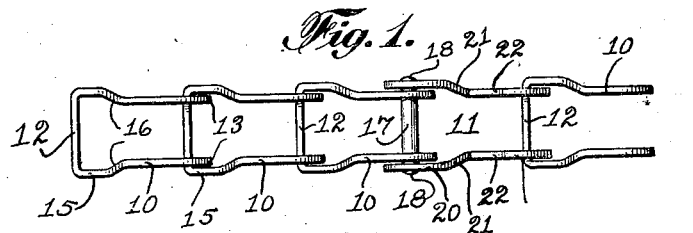
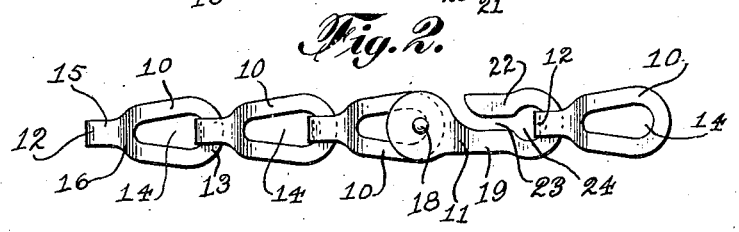
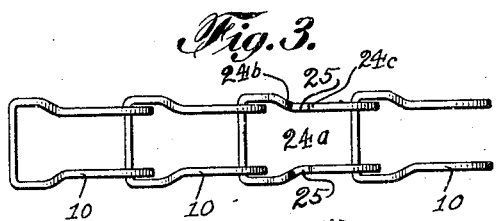
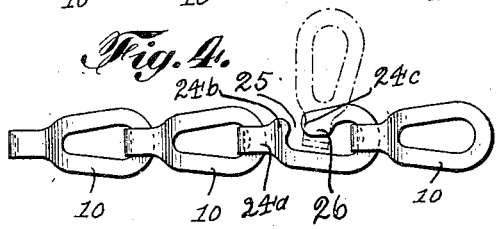
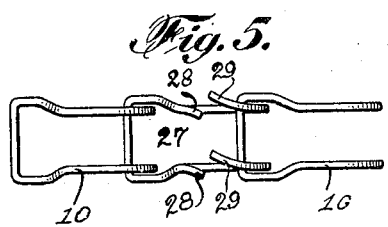
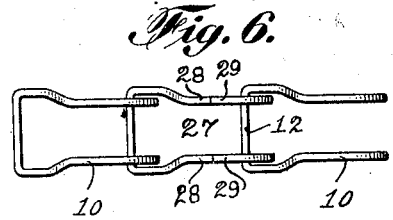
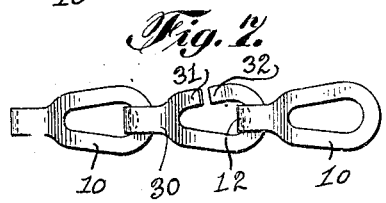
INVENTOR
*Theodore Russell,*
BY
*H. G. Manning*
ATTORNEY Patented Jan. 1, 1929.

1,697,540

UNITED STATES PATENT OFFICE.

THEODORE RUSSELL, OF NAUGATUCK, CONNECTICUT, ASSIGNOR TO THE JOHN M. RUSSELL MANUFACTURING COMPANY, INCORPORATED, OF NAUGATUCK, CONNECTICUT, A CORPORATION OF CONNECTICUT.

FASTENER LINK FOR SPROCKET CHAINS.

Application filed April 22, 1926. Serial No. 103,918.

This invention relates to chains, and more particularly to a sprocket chain having sheet metal links. The invention herein disclosed is a continuation in part of the invention described and claimed in Patent #1,600,016 for sprocket chains granted to the same inventor on September 14, 1926, on an application filed February 21, 1925.

One object of this invention is to provide a sprocket chain of the above nature composed of one-piece U-shaped links, the sides of said links being spaced apart and lying parallel to each other.

A further object is to provide a special form of fastener link for detachably connecting the ends of a sprocket chain of the above nature.

A further object is to provide a sprocket chain in which the links are light and at the same time rigid in construction so that the chain will not be likely to lengthen or twist out of shape when in use.

A further object is to provide a device of this nature which will be simple and inexpensive to manufacture, ornamental in appearance, and very efficient and durable in use.

With these and other objects in view there have been illustrated on the accompanying drawings, four forms in which the invention may be conveniently embodied in practice.

Fig. 1 represents a top view of a section of the sprocket chain having a fastener link constructed in accordance with the first form of the invention.

Fig. 2 is a side view of the same.

Fig. 3 is a top view of a section of sprocket chain having a fastener link constructed in accordance with the second form of the invention.

Fig. 4 is a side view of the same, showing how the free end link is twisted up for disconnecting it from the fastener link.

Fig. 5 is a top view of a section of sprocket chain having a fastener link made according to a third form of the invention, said fastener link being shown as it appears before its split sides have been closed up.

Fig. 6 is a top view of the same showing the fastener link as it appears after its split sides have been closed up to lock it to the free end link of the chain.

Fig. 7 is a side view of a section of sprocket chain having a fourth alternative form of fastener link.

Referring now to the drawings in which like reference numerals denote corresponding parts throughout the several views, the chain shown in Figs. 1 and 2 is composed of a series of main links 10 of identical construction, the end links of said chain being joined by a special form of connecting or fastener link 11.

In the manufacture of the main links 10, a flat blank is first stamped out of sheet metal, said blank comprising a narrow central base portion or "bridge" 12 and a pair of enlarged oval apertured arms or hook sections 15, having eyes 14 formed therein.

In order to form the main links, the blanks are bent up into substantially U-shaped form, as shown in Fig. 1, the arms of said links being disposed at right angles to the base portions 12 thereof. The free extremities 13 of said arms 15 are offset inwardly from the planes of the other ends of said arms so that when the links are assembled in a chain, the eyes 14 of one link will surround the narrow base portions 12 of the next adjoining link, and the arms 15 of the first link will lie under the arms of said adjoining link, thereby allowing the links to hinge freely over one another. The extremities 13 of the arms 15 are connected to the other ends thereof by converging inclined sections 16, as clearly shown in Fig. 1.

The first form of fastener link for joining the end links of the chain is shown in Figs. 1 and 2 and comprises a cross rod 17, having headed extremities 18 and a pair of side arms 19 rigidly mounted on said cross rod 17. The side arms 19 are provided with rear circular sections 20, connected by converging inclined sections 21 to forward hook sections 22.

The hook sections 22 are provided with horizontal passageways 23 leading to circular eyes 24 which are adapted to encircle the base section 12 of the adjacent main link 10. As will be evident, the connecting link 11 is adapted to be permanently joined by means of its cross rod 17 to one of the end main links and detachably joined by the hook sections 22 to the other end or free link of the chain.

In operation, when it is desired to detachably join the first form of fastener link 11 with the free end link 10 of the chain, it will only be necessary to twist said fastener link 11 downwardly to a vertical position, as viewed in Fig. 2, until the passageways 23 are parallel with the bridge 12 of said free end link 10, the latter link meanwhile being held horizontal. The bridge 12 may then be moved through the passageways 23 until it reaches the bottom of the eyes 24, after which the fastener link 11 may be swung back about the cross rod 17 into horizontal position in alinement with the remaining links of the chain.

In the modified form of the invention shown in Figs. 3 and 4, the main links of the sprocket chain are identical with those of the first form described above. A different fastener link 24$^a$ is provided, however, for connecting the two end links of the chain. In this instance the fastener link is preferably constructed integrally from one piece of metal, as by stamping and bending. The fastener link is similar to the main links 10, except that the eyes 14 are slotted or cut away at the top to provide openings 25 to permit the insertion and removal of the free end link 10 of the chain.

In order to facilitate the insertion and removal of said end link, the edges 24$^b$ and 24$^c$ of each cut-away opening 25 are rounded, as clearly shown in Fig. 4. The forward edge of said cut-away opening is provided with a depending lug 26 which serves to lock the bridge 12 of the free end link in position and prevent accidental opening of the sprocket chain.

In the operation of the second form of the invention, it will be seen that when it is desired to disconnect the free end link 10 from the fastener link 24$^a$, it will merely be necessary to swing said free end link upwardly in an anti-clockwise direction to the position indicated by dotted lines in Fig. 4. The free end link 10 may then be moved to the left and swung down in a clockwise direction and removed from said fastener link 24$^a$.

In the modified form of the invention shown in Figs. 5 and 6, a fastened link 27 is disclosed which is constructed from a main link 10 merely by making slits in the top portions of the forward loops surrounding the eyes 14. The adjacent ends 28 and 29 of said slitted loops are spread apart to the position shown in Fig. 5 to permit the insertion of the bridge 12 of the free end link 10 of the chain. The ends 28 and 29 are then forced together into alinement, as shown in Fig. 6, the loops thereby being closed up for securely holding said bridge 12 in locked position.

In the modified form of the invention shown in Fig. 7, a fastener link 30 is disclosed, said link 30 being made from a main link 10 merely by forming slots in the top portions of both side loops thereof. In this form of fastener link the adjacent ends 31 and 32 of the slotted loops are spaced apart sufficiently to permit the passage of the bridge 12 for inserting and removing the free end link 10. This form of fastener link is similar to the form shown in Figs. 3 and 4, except that the ends 31 and 32 have sharp edges instead of being rounded like the ends 24$^b$ and 24$^c$ of the second form shown in Figs. 3 and 4. Moreover, the form shown in Fig. 7 has no member corresponding to the depending lug 26 of the form in Figs. 3 and 4.

While there have been disclosed in this specification four forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a fastener link for a sprocket chain, a flat base member adapted to lie transversely to the length of the chain, side members integral with the base member; a pair of longitudinal flat eye sections arranged parallel to each other, said eye sections having elongated narrow open slots to receive the flat base member of the free end link of the chain, said eye sections being offset inwardly to guide the teeth of a sprocket wheel substantially as described.

In testimony whereof, I have affixed my signature to this specification.

THEODORE RUSSELL.